Dec. 22, 1964  P. GANCEL  3,162,272
YOKE-CALIPER TYPE DISC BRAKE
Filed Nov. 6, 1961  6 Sheets-Sheet 1

INVENTOR.
PIERRE GANCEL
BY
Sheldon F. Raizes
ATTORNEY

Dec. 22, 1964 P. GANCEL 3,162,272
YOKE-CALIPER TYPE DISC BRAKE
Filed Nov. 6, 1961 6 Sheets-Sheet 4

INVENTOR.
PIERRE GANCEL
BY
Sheldon F. Raizes
ATTORNEY

INVENTOR.
PIERRE GANCEL

Dec. 22, 1964 P. GANCEL 3,162,272
YOKE-CALIPER TYPE DISC BRAKE
Filed Nov. 6, 1961 6 Sheets-Sheet 6

INVENTOR.
PIERRE GANCEL
BY
Sheldon F. Rayes
ATTORNEY 3,162,272
YOKE-CALIPER TYPE DISC BRAKE
Pierre Gancel, Levallois, France, assignor to Société Anonyme D.B.A., Paris, France, a company of France
Filed Nov. 6, 1961, Ser. No. 150,505
Claims priority, application France Nov. 10, 1960
12 Claims. (Cl. 188—73)

The invention concerns swinging housing disc brakes of the type which comprises a housing straddling an angular portion of a rotating disc to be braked, and provided with actuating means causing the swinging of the housing on a fixed axis to cause the application of a pad forming part of the housing against one face of the disc and the displacement of a second pad with respect to the housing to apply it against the opposite face of the disc.

Various disc brakes of this type have been constructed in the past but they have not found application in practice in view of certain disadvantages. In a first type of brake, the best known, the pivotable housing was constructed in a single piece, generally cast, and presented the following alternative: either shorten the distance from the axis to the pad in order to decrease the moment of inertia of the housing, with a corresponding lack of uniformity of application and wear of the pads; or accept a large radius with as a result a heavy housing, bulky and of an inertia too high to permit it to follow the deflections of the disc. Furthermore, the fabrication of a housing in one piece, necessarily of a complex form, remains difficult.

A second type of brake utilizes two separate pieces, one to guide the pads and to absorb the braking effort to which they were subjected by the disc, the other to effectuate squeezing; but this solution led to the anchoring of the pads in zones spaced from the resultant of the braking efforts which they underwent and caused the appearance of elevated swinging moments. Furthermore, the construction of this type of brake was complex and relatively expensive.

It is necessary to note as well that in all of the brakes of the art prior to this invention, the friction pads were made of separate pieces which did not contribute to the rigidity of the swinging housing. Accordingly, its strength, and therefore its weight, had to be increased.

An object of the present invention is to provide a light brake, of simple manufacture and assembly, and exempt from the disadvantages above-described. To this end, an aspect of the invention lies in the employment of a composite housing formed of two laterally spaced calipers swingable about a fixed axis and joined together by the friction pads themselves so as to form a box structure to reduce the deformations of the housing under the action of the forces which occur during braking.

A further aspect of the invention is to provide a swinging housing with means for fully engaging the friction pads with their respective rotor friction faces.

According to another aspect of the invention, the two calipers straddling the disc are connected together by a cylinder block having at least one cylinder formed therein which receives a slidable piston therein for applying one of the friction pads against one of the disc faces wherein the cylinder block swings with the housing to apply the other pad against the opposite face of the disc.

The cylinder block is advantageously mounted on the calipers in such a way that its orientation on the housing is modified when the piston does not fully contact the pad as a result of the wearing of the friction lining. This latter improvement makes totally superfluous the employment of a sliding disc, a costly solution which has however been utilized in the past in order to permit the shortening of the swing radius of the housing.

The mounting of the cylinder on the calipers may advantageously be arranged so as to permit the two calipers to turn slightly one with respect to the other thereby to compensate for any deflection of the disc. Such movement of the calipers is facilitated by giving a rounded rather than a flat form to the portions of the block cylinder engaging the calipers, but one may rely equally on the normal mounting clearance with the condition that the cylinder not be blocked on the calipers.

Yet another aspect of the invention is to provide a disc brake with an automatic positioning device for a mechanical actuating lever.

The invention will be better understood from a consideration of the description which follows and refers to the accompanying drawings illustrating various embodiments of the invention and given as non-limiting examples. In the drawings:

FIGURE 5 is a view in cross section taken along line 5—5 of FIGURE 4;

Figure 1:
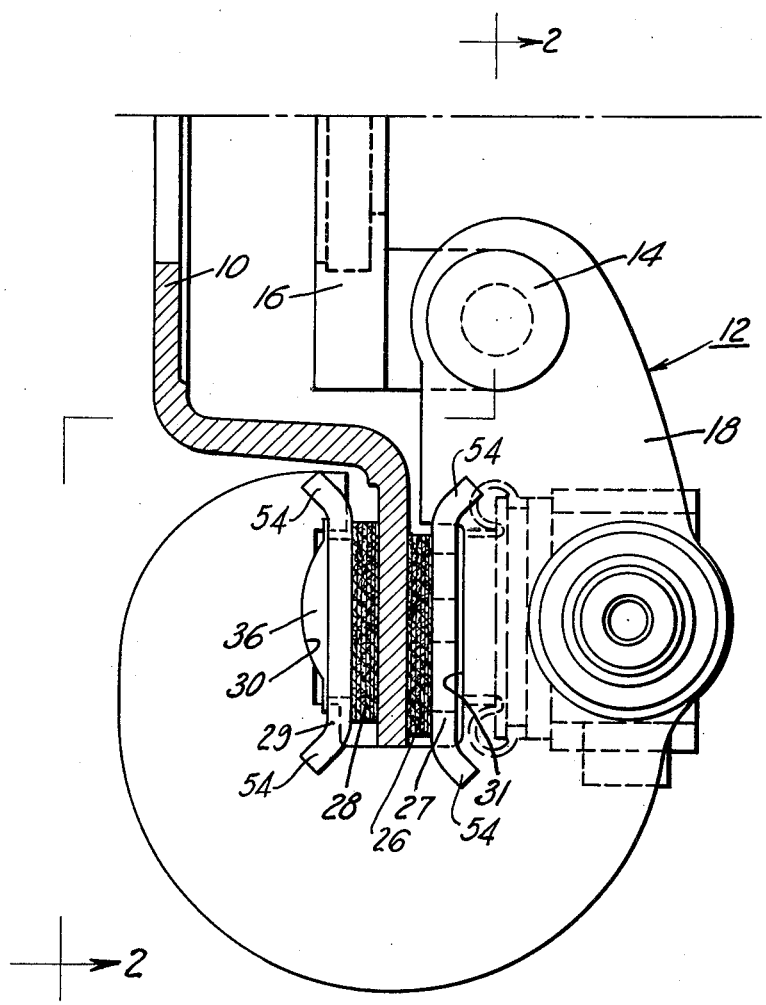
FIGURE 1 is an elevation view of a disc brake in accordance with the invention.
Figure 2:
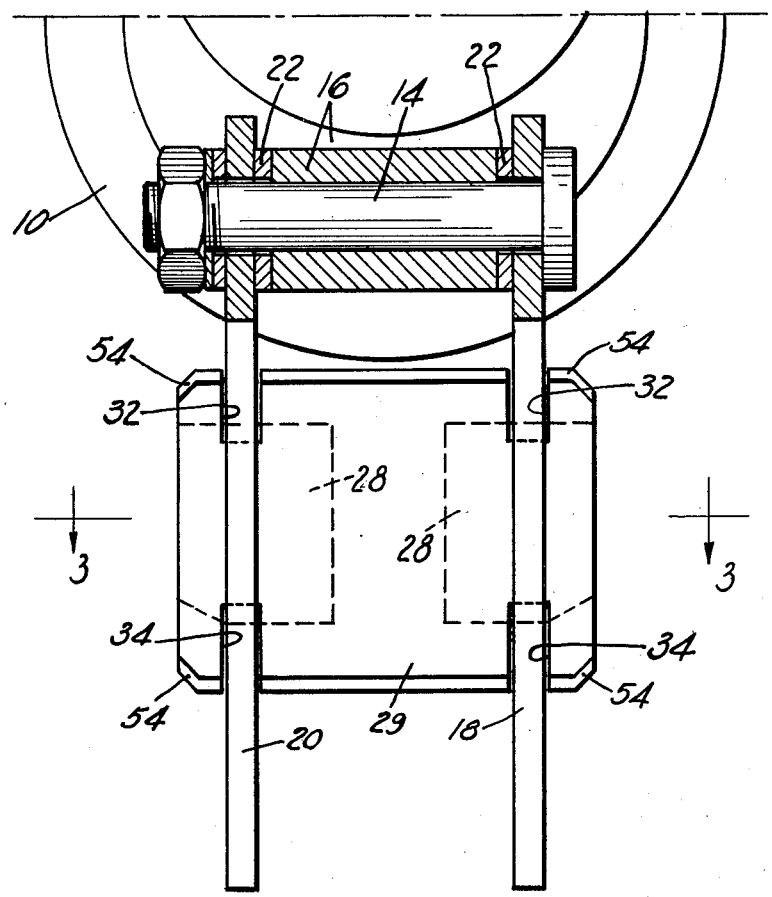
FIGURE 2 is a view partly in cross section taken along line 2—2 of FIGURE 1, the disc being omitted for the sake of clarity.
Figure 3:
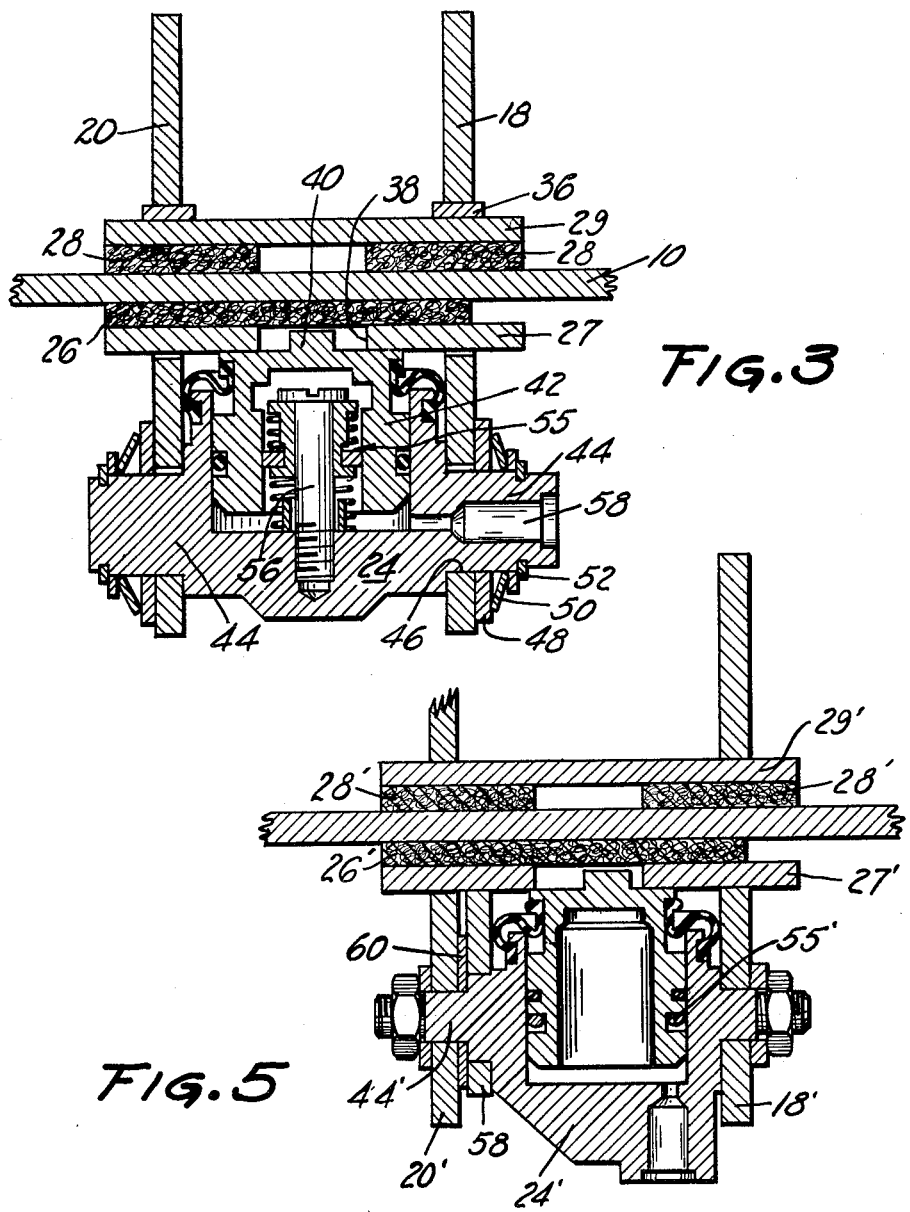
FIGURE 3 is a view in cross section taken along line 3—3 of FIGURE 2.

The brake shown in FIGURES 1 to 3 comprises a rotating disc 10 which is restrained against axial movement, and a swinging housing generally designated by the reference numeral 12. The housing 12 swings on an axle 14 carried by an adaptor 16 fixed to the spindle of a wheel not shown. The housing comprises two I-shaped calipers 18 and 20 which straddle the outer periphery of the disc 10. The two calipers are pivoted on the axle 14 at the extremity of their longest arm and the washers 22 interposed between the calipers and the adaptor serve as spacing means and reduce the friction forces opposing the swinging of the housing (FIG. 2).

The two calipers are connected by a cylinder block 24 and by two pad assemblies 26, 27 and 28, 29 with the pad assembly 28, 29, fixed with respect to the calipers, forming a part of the housing. The connection of the calipers and of the pad assembly 28, 29 is realized by the engagement of the portions of the calipers at each end of a recess 30 in notches 32 and 34 formed in the sheet metal support 29 of the lining 28 (FIG. 1). If the calipers bear directly against the pad assembly 28, 29 the recess must present a convex form in order to apply pressure on the pad assembly 28, 29 at a point which is displaced as the lining 28 wears to assure a correct application of the pad assembly 28, 29 in all cases. But the elevated pressure at the point of contact might deform the calipers unless the latter are made of sheet metal treated at the zone of contact. The embodiment illustrated in FIGURES 1 through 3, preferable in many cases, consists in forming a concave recess and interposing half-moon pieces 36 between the pad assembly 28, 29 and the calipers 18 and 20 wherein assembly 28, 29 the straight edge thereof bears against the pad assembly 28, 29 and the opposite circular edge is adapted to slide on the bottom of the recess.

The pad assembly 26, 27, which moves with respect to the housing, contributes as well to the rigidity of the housing and is connected to the housing in substantially the same manner as pad assembly 28, 29, except that the sliding of the movable pad assembly 26, 27 as the friction lining 26 wears makes it necessary to form recess 31 deeper than recess 30. The sheet metal support 27 of the lining 26 is pierced by a central hole 38 (FIG. 3) through which is fitted a terminal projection 40 of the piston 42. Only the periphery of the piston engages the pad assembly 26, 27 so that a large swinging moment is created to turn the cylinder block as soon as the piston no longer presses flatly against the sheet metal support 27. The cylinder block is provided with two lateral shafts 44 which extend through holes 46 pierced in the calipers 18 and 20. The coupling between the cylinder and the calipers is assured by friction washers 48 pressed against the calipers by an elastic element such as a Belleville washer 50 retained in compression by a snap ring 52. As the friction lining 26 wears, the orientation of the cylinder block with respect to the calipers changes under the action of off-set force which occurs when the piston tends to apply the pad assembly 26, 27 obliquely with respect to the disc.

It will be noted that the interconnection of the calipers is assured by the fixed pad assembly 28, 29, by the movable pad assembly 26, 27 (this latter, however, bearing only laterally on the calipers) and by the cylinder. The box structure so constituted is capable of being deformed slightly in order to compensate for deflections of the disc due, for example, to deformations under pressure. The pad assembly 28, 29 adapts itself to the plane of the disc by turning the calipers slightly one with respect to the other. As far as the mounting clearances have not been taken up, only the elasticity of the washers 50, which tends to maintain the cylinder block perpendicular with respect to the calipers, opposes this deformation.

FIGURE 1 shows that the edges of the plate support of the pad assemblies, or at least the end portions 54 thereof, are bent toward the rear. This form is not obligatory, but it avoids totally the risk of losing the pads when the friction linings approach a state of wear requiring their replacement.

A device 55 which automatically compensates for lining wear is interposed between the piston 42 and a pin 56 fixed to the cylinder block 24. The device represented is of a type which is provided with a spring which elastically absorbs axial deflections of the disc without transmitting them to the housing. A complete description of this type of device is given in U.S. patent application Serial No. 63,894, filed on October 20, 1960, and now U.S. Patent No. 3,134,459. When the moment of inertia of the housing 12 with respect to the axle 14 is sufficiently small to allow the housing to follow deflections of the disc without inertia, this wear compensating device may be replaced by a simple friction ring coupling the piston to the cylinder and allowing the piston to move freely a predetermined distance with respect to the cylinder.

The operation of the brake is the following: When the liquid under pressure coming from a master cylinder or from a control valve is admitted behind the piston 42 by an orifice 58, two equal and opposite forces are exerted on the piston and on the bottom of the cylinder. The piston directly applies the lining 26 against one of the faces of the disc while the force exerted on the cylinder is transmitted to the calipers and its moment with respect to the axle 14 imparts swinging of the housing and the application of the lining 28 against the other face of the disc.

The friction force exerted by the rotating disc on linings 26 and 28 during braking is transmitted to calipers 18 and 20 by the sides of the slots 32 and 34 on the calipers. Because of the coupling of the calipers by the pad assemblies the housing forms a box structure capable of transmitting large forces to the axle 14 without noticeable deformations.

As the friction linings wear, the orientation of the housing with respect to the disc changes, but the bearing members or the half-moons 36 slide on the bottom of the recess 30 in the calipers 18 and 20 and the cylinder block 24 turns in the holes 46, so as to assure correct bearing of the linings on the disc.

When the friction linings must be replaced, it suffices to remove the axle 14 in order to be able to disengage the housing 12 from the disc without intervening with the hydraulic circuit. One may then remove the used pad assemblies, push in the piston completely and insert pad assemblies provided with new linings. The housing is then remounted on the adapter 16 and the brake is again ready to operate.

Figure 4:
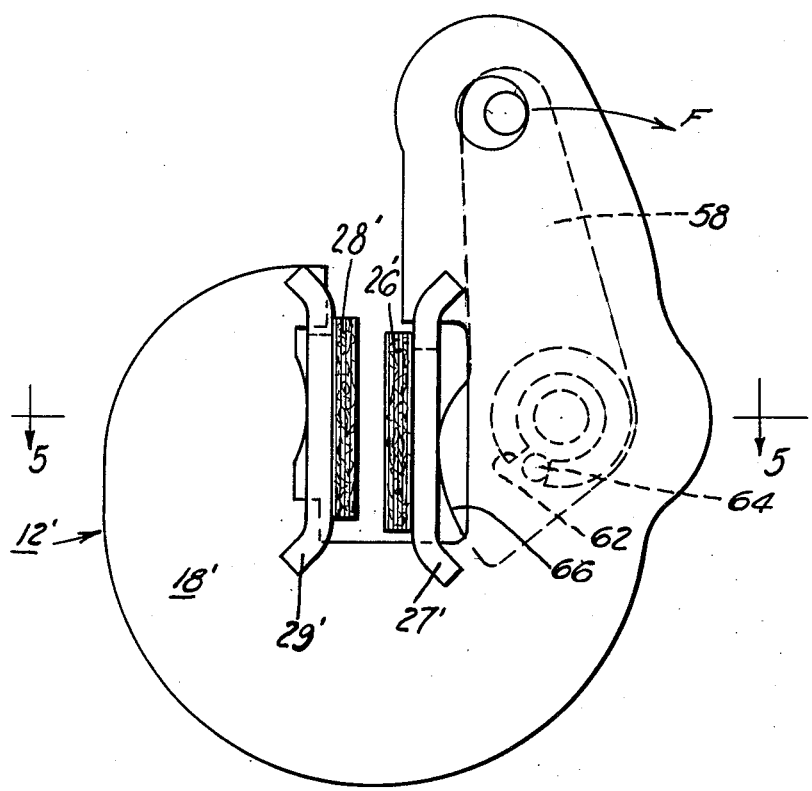
FIGURE 4 is an elevation view of another embodiment of the invention.
Figure 9:
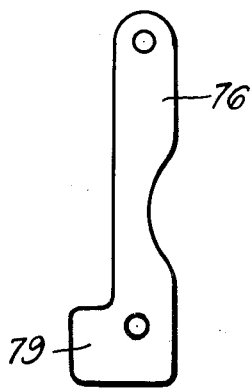
FIGURES 8, 9 and 10 show details of various elements shown in the embodiments of FIGURES 6 and 7.

The embodiment represented in the FIGURES 4 and 5 differs from the preceding essentially by the addition of a mechanical brake actuator. On the other hand, various simplifications have been made as well. For example, the cylinder block is rigidly fixed to the calipers, the pressure of the calipers on the "fixed" pad is direct, and the wear compensating means of FIGURE 3 (with elastic compensation for deflections of the disc) is replaced by a simple friction ring 55'. In order that the brake may operate satisfactorily despite this last simplification, the housing must be able to follow the deflections of the disc without the appearance of forces (friction and inertia), so large as to oppose such movement, that is to say the friction of the calipers on the axle 14 and the moment of inertia of the housing must be reduced as much as possible.

In FIGURES 4 and 5, the parts corresponding to others already represented in FIGURES 1 through 3 are given the same reference numeral with the addition of a prime symbol. The housing 12' is again composed of two calipers 18' and 20' interconnected by pads 26' and 28', and a cylinder block 24' rigidly fixed to the calipers. In order to assure a rigid connection of the cylinder block to the calipers, the shafts 44' may be formed to present an irregular and not circular cross section. On the cylinder block 24' is mounted a mechanical brake actuator (parking brake) formed by a cam-lever 58 which turns freely on one of the shafts 44' (FIGURE 5). A friction washer 60 is squeezed between the caliper 20' and a shoulder of the shaft 44' and has a slot 62 receiving a pin 64 carried by the lever 58 (FIG. 4). The application of the brake by the mechanical control is effected by pulling on the free extremity of the lever 58 in the direction of the arrow F. The profile edge 66 of the cam portion of the lever 58 applies the pad 26' and the reaction on the shafts 44' causes the swinging of the housing 12' about its axle so as to apply the pad assembly 28', 29'.

The application forces are obviously off-set with respect to the median plan of the brake, but the rigidity of the housing (the cylinder being rigidly fixed to the calipers) permits the transmission of the forces to the axle 14' without any noticeable deformation.

If the amplitude of displacement of the pin 64 in the course of application of the lever 58 exceeds the play provided in the slots 62, the pin drags into rotation the friction washer 60. When the lever 58 is released, the angular return of the lever is limited to the clearance between the pin and the slot. The friction of the washer 60 against the caliper 20' obviously must be sufficient so as to not be overcome by the return force of the lever 58.

If the mounting of the cylinder 24' was similar to that of the cylinder 24 of FIGURES 1 through 3 and permitted it to turn with respect to the calipers, it would have been necessary to give to the mechanical actuator a symmetric structure with respect to the median plane of the brake. For that purpose one may for example utilize a double cam-lever, in the form of a fork, having a branch on either side of the cylinder.

Figure 6:
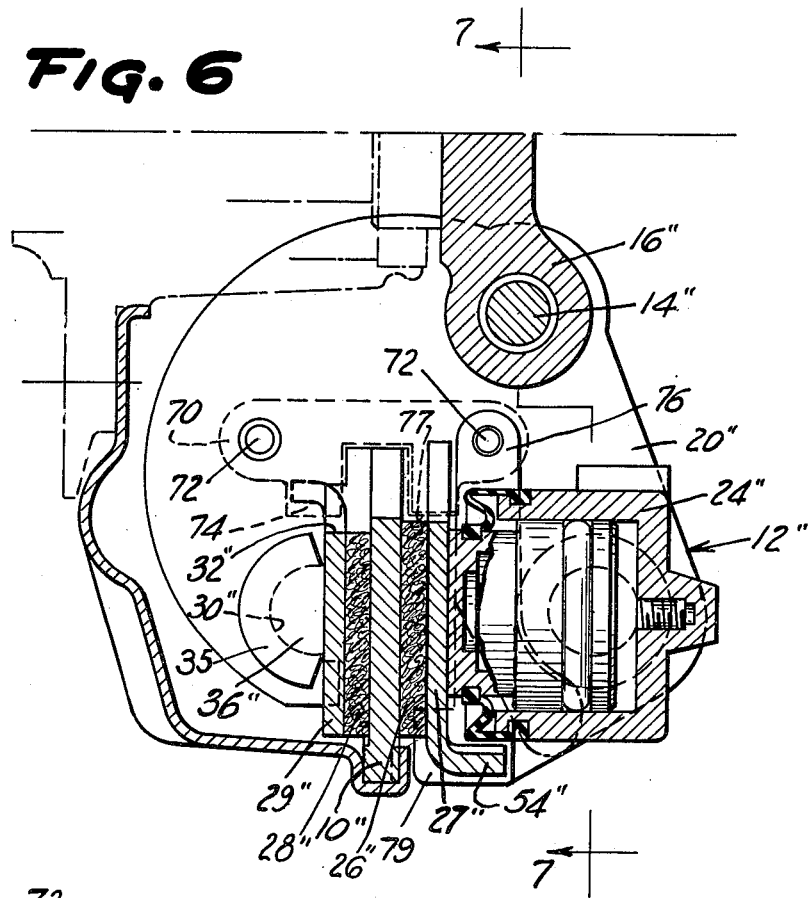
FIGURE 6 is a view along the median plane and partly in cross section of still another embodiment of the invention.
Figure 8:
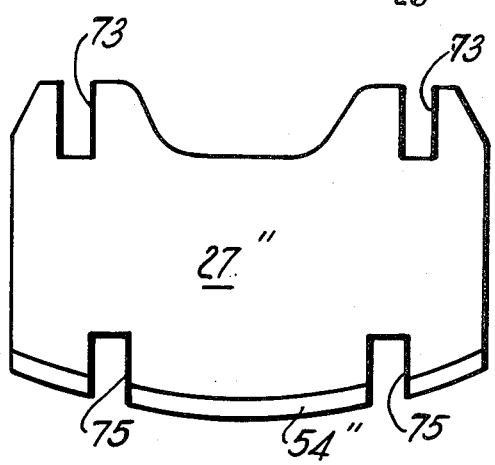
Figure 7:
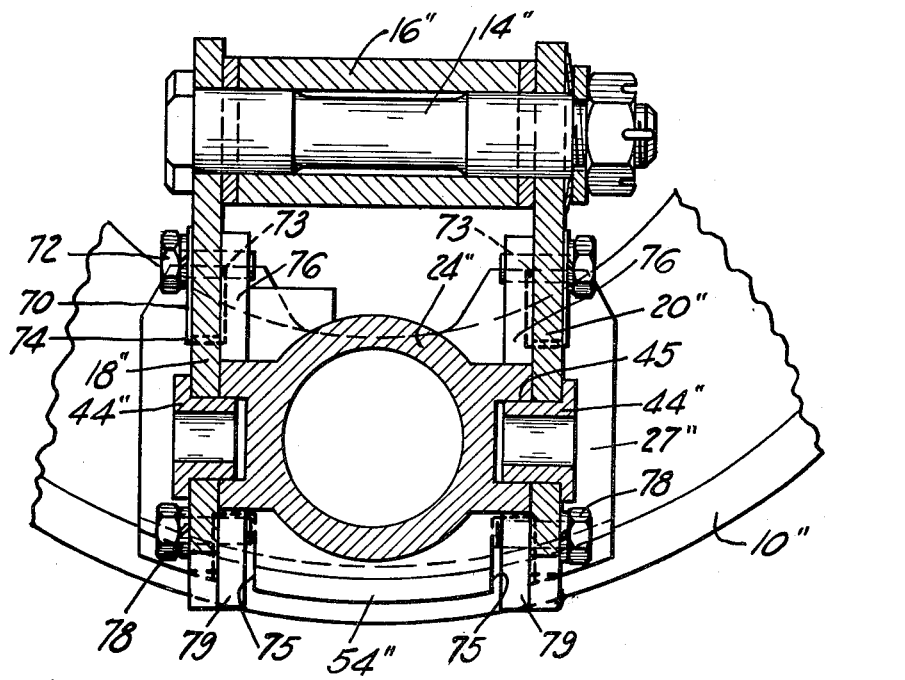
FIGURE 7 is a view in cross section taken along line 7—7 of FIGURE 6.
Figure 10:
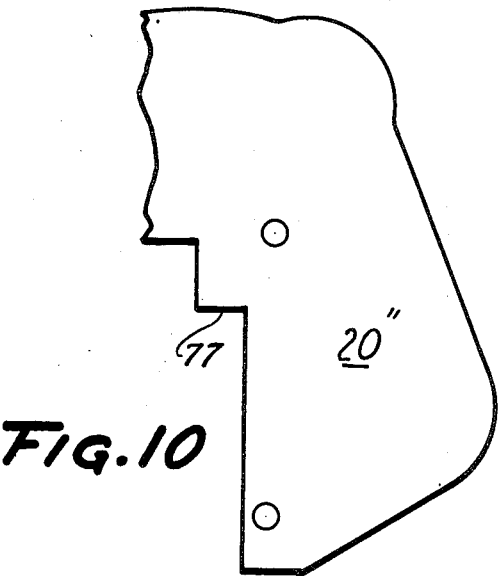

The embodiment represented in FIGURES 6 and 7 differs essentially from the preceding in that it comprises a disc secured at its outer periphery to its driving member. The present tendency is to employ wheels of small diameter (12 inches, that is approximately 300 millimeters) where the available space inside the rim is limited. Under these conditions, a brake in which the housing is placed radially outwardly of the disc would have a disc of small diameter and the linings would engage the disc at a zone having a small linear velocity for a given speed of rotation of the disc. The braking energy developed for a given application force of the pad assemblies varies as a direct function of the linear speed; thus the efficiency of the brake would be reduced. This makes the use of an annular disc secured at its outer periphery to the wheel and the housing being placed internally of the disc advantageous.

In FIGURES 6 and 7, the parts corresponding to others already represented in FIGURES 1 through 3 are designated by the same reference numeral with the addition of a double-prime symbol. The housing 12″ straddling the disc 10″ is formed of two calipers 18″ and 20″ interconnected by friction pad assemblies 26″, 27″ and 28″, 29″. The cylinder block 24″ is coupled to the calipers by two shafts 44″, sleeved in the calipers and advantageously soldered to them, which penetrate into blind bores 45 of the cylinder block (FIG. 7). The lateral faces of the cylinder block which bear against the calipers have been represented as flat but they may be as well, slightly curved in order to facilitate the orientation of the cylinder normally to the disc in the case of deflection of the latter.

In this solution, the housing is pivoted at the bottom of the calipers 18″ and 20″ on the axle 14″ carried by the adaptor 16″. The adaptor is fixed to the spindle in the case of mounting on the forward wheel. The radius of swing of the housing in the zone of the pad assemblies is very short and it is necessary to compensate for the large variation in the angle of the housing in proportion to the wearing of the friction linings. The pivoting of the cylinder block 24″ on the shafts 44″ assures correct application of the moveable pad assembly 26″, 27″. Bearing members or half moons 36″ interposed between the calipers and the fixed pad assembly 28″, 29″ assure the correct application of the latter. The curvature and the angular extent of the face of half-moons which bears against the bottom of the recesses 30″ must be sufficient so that the sliding of the half-moons is readily effected and compensates for the totality of the swing of the housing as the friction linings wear. The bearing member 36″ has an arcuate flange 35 which is split to extend on each side of the caliper 20″ to guide the rotational sliding movement of bearing member 36″ thereon. The backing plate 27″ has two sets of slots 73 and 75. Each caliper member has a guide edge 77 received in a respective one of the slots 73 and a swingable stop 76 each having an ear 79 extending into a respective one of the slots 75 to limit radial movement of the pad assembly 26″, 27″.

A supplementary improvement consists in the addition between the pad assemblies and the calipers of spring blades 70 intended to suppress vibrations which are a source of disagreeable noises. Each spring blade 70 is fixed to a caliper by two screws 72, and possesses two curved projections 74 each penetrating into the notch 32″ of the pad assembly and extending between the pad assembly and the caliper. These projections, squeezed between calipers and pad assemblies, elastically support the latter and avoid vibrations thereof.

The mounting of the disc at the outside of the housing prohibits the removal and replacement of the pad assemblies by the method described for the embodiments of FIGS. 1 to 5. To permit this operation, the brake of FIGS. 6–7 makes use of calipers equipped with the swingable stops 76. These stops 76 are normally fixed by screws in the position in which they are represented in FIG. 6 so as to lock the end portion 54″ of the friction pad assembly 26″, 27″ (FIG. 6). One of the screws may also be one of those which fix the corresponding spring blade 70.

In order to remove the friction pad assembly, it suffices to remove the screw 78 from the stops 76 (FIG. 7) and to swing the stops about the screws 72 (in a counterclockwise direction in FIG. 6) to disengage the pad assembly 26″, 27″. Once this latter has been removed, the housing may be swung sufficiently in a clockwise direction to disengage the pad assembly 28″, 29″ from the calipers and to permit the withdrawal of the pad assembly in the circumferential direction. The inverse operation permits the insertion of new pad assemblies after having completely pushed in the piston.

The automatic adjusting means with which the cylinder is equipped is of the type which elastically absorbs the deflections of the disc by means of a shock absorber spring, like that shown in FIG. 3. When one pushes the piston into its cylinder, the shock absorber spring is compressed, then it expands as soon as the pressure ceases. The amplitude of the retractile movement of the piston should be adjusted so that the terminal element 40″ of the piston will not be disengaged from the hole in the support of the pad assembly 26″, 27″.

The embodiments represented and described constitute only non-limitative examples and it must be understood that the present invention extends to all mechanically equivalent devices.

What is claimed is:

1. A disc brake comprising: a rotor having friction surfaces thereon, a support member, a pair of spaced caliper members straddling said rotor, a cylinder block on one side of said rotor and extending between said caliper members, actuating means carried by said cylinder block, a round opening in each of said calipers, a round boss on each lateral end of said cylinder block projecting through a respective one of said openings, said openings being oversized relative to their respective bosses, means resiliently securing said bosses and thereby said cylinder block to said calipers whereby said cylinder block is pivotable and angularly movable relative to said caliper members, means securing said caliper members to said support member for movement in a direction transverse to the plane of said rotor friction surfaces, a pair of friction members one opposite each of said rotor friction surfaces, one of said friction members being carried by said calipers for movement thereby into engagement with said rotor and the other of said friction members being slidable relative to said caliper members for engagement with said rotor by said actuating means.

2. The structure as recited in claim 1 wherein said caliper members are connected to said support member for pivotal movement about a common axis.

3. A disc brake comprising: a rotor having friction surfaces thereon, a support member, housing means straddling said rotor and comprising a pair of circumferentially spaced portions extending across the periphery of said rotor and a cylinder block located opposite one of said friction surfaces and between said circumferentially spaced portions, means connecting said cylinder block to said circumferentially spaced portions for movement of said cylinder block relative to said circumferentially spaced portions, actuating means carried by said cylinder block, means securing said housing to said support member for movement in a direction transverse to the plane of said rotor friction surfaces, a pair of friction members one opposite each of said rotor friction surfaces, one of said friction members being operatively connected to said circumferentially spaced portions for movement into engagement with its respective rotor friction surfaces and the other of said friction members being slidable relative to said circumferentially spaced portions for engagement with its respective rotor friction surface by said actuating means.

4. The structure as recited in claim 3 wherein said connection of said cylinder block to said circumferentially spaced portions is a pivotal one for pivoting of said cylinder block relative to said circumferentially spaced portions about an axis generally parallel to said friction surfaces.

5. The structure as recited in claim 4 wherein said pivotal connection comprises round bosses and round boss receiving openings.

6. The structure as recited in claim 5 wherein said openings are oversized for allowing angular relative movement between said circumferentially spaced portions and said cylinder block.

7. The structure as recited in claim 6 wherein said connection further comprises resilient means acting on said circumferentially spaced portions and said cylinder block urging the same into a generally perpendicular relationship therebetween.

8. The structure as recited in claim 7 further including means pivotally connecting said housing to said support member.

9. The structure as recited in claim 3 wherein said connection between said cylinder block and said circumferentially spaced portions provides for angular relative movement therebetween.

10. The structure as recited in claim 3 wherein said connection comprises bosses and oversized boss receiving openings providing relative angular movement between circumferentially spaced portions and said cylinder block.

11. The structure as recited in claim 10 wherein said connection further comprises resilient means acting on said circumferentially spaced portions and said cylinder block resisting angular movement therebetween.

12. The structure as recited in claim 11 further including means pivotally connecting said housing to said support member.

References Cited in the file of this patent

UNITED STATES PATENTS

| | | |
|---|---|---|
| 2,385,621 | Freeman et al. | Sept. 25, 1945 |
| 2,385,622 | Freeman et al. | Sept. 25, 1945 |
| 2,533,186 | Bricker et al. | Dec. 5, 1950 |
| 2,575,578 | Bricker | Nov. 20, 1951 |
| 2,655,229 | Eksergian | Oct. 13, 1953 |
| 2,689,024 | Trevaskis | Sept. 14, 1954 |
| 2,820,530 | Chouings et al. | Jan. 21, 1958 |
| 2,862,580 | Burnett | Dec. 2, 1958 |
| 2,862,581 | Lucien | Dec. 2, 1958 |
| 2,921,651 | Myers | Jan. 19, 1960 |
| 2,987,142 | Gracie | June 6, 1961 |
| 3,035,664 | Desvignes et al. | May 22, 1962 |
| 3,044,580 | Butler | July 17, 1962 |
| 3,047,098 | Olley | July 31, 1962 |

FOREIGN PATENTS

| | | |
|---|---|---|
| 806,919 | Great Britain | Jan. 7, 1959 |
| 1,060,672 | Germany | July 2, 1959 |